March 9, 1926.
H. I. SURLS ET AL
1,576,485
VEHICLE HEATER
Filed Dec. 2, 1925
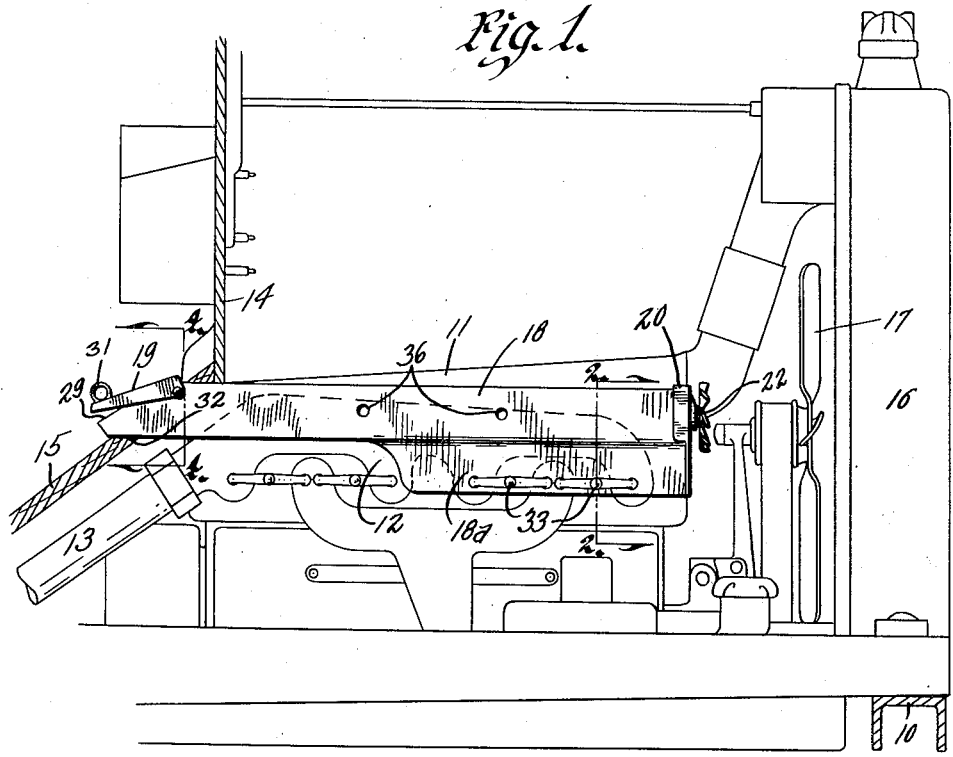
Fig. 1.
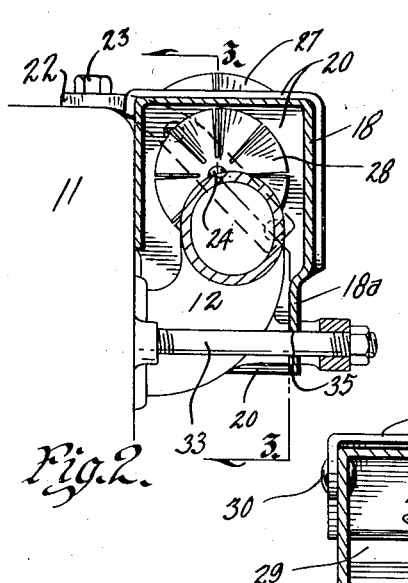
Fig. 2.
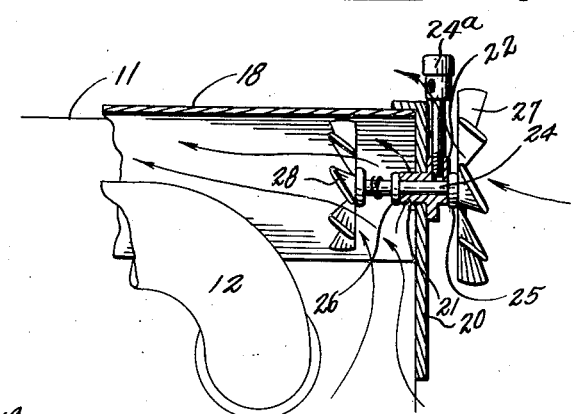
Fig. 3.
Fig. 4.
Witness
Rae Rusher
Inventor
Hampton I. Surls & John J. Kennedy
by Bair & Freeman Attorneys Patented Mar. 9, 1926.

1,576,485

UNITED STATES PATENT OFFICE.

HAMPTON I. SURLS AND JOHN T. KENNEDY, OF IOWA FALLS, IOWA, ASSIGNORS OF ONE-THIRD TO WILLIAM DUNNING, OF IOWA FALLS, IOWA.

VEHICLE HEATER.

Application filed December 2, 1925. Serial No. 72,668.

*To all whom it may concern:*

Be it known that we, HAMPTON I. SURLS and JOHN T. KENNEDY, citizens of the United States, and residents of Iowa Falls, in the county of Hardin and State of Iowa, have invented a certain new and useful Vehicle Heater, of which the following is a specification.

The object of our invention is to provide a vehicle heater of simple, durable and inexpensive construction.

More particularly, the purpose of the present invention is to provide a heater of the type providing an enclosure for a heated part of an engine for conducting air to the interior of the body of the car, which device has means adapted to be actuated by the draft caused by the ordinary fan for actuating another means for affording forced draft through the heater, the heat enclosure, however, being closed at its front end so that air is not drawn directly through the radiator to the heater, but must be drawn from below in such manner as not to draw in the coldest of the air.

With these and other objects in view, our invention consists in the construction, arrangement and combination of the various parts of our vehicle heater, whereby the objects contemplated are attained, as hereinafter more fully set forth, pointed out in our claims, and illustrated in the accompanying drawings, in which:

Figure 1 is a side elevation of a motor vehicle engine equipped with a heater embodying our invention, parts of the frame of the vehicle and the floor thereof being shown in vertical section.

Figure 2 is a transverse, detail, sectional view taken on the line 2—2 of Figure 1.

Figure 3 is a detail, sectional view of the heater device taken on the line 3—3 of Figure 2, the exhaust manifold being shown in elevation; and Figure 4 is a transverse, sectional view taken on the line 4—4 of Figure 1.

In the drawings filed herewith, wherein we have illustrated a preferred form in which our invention may be embodied, we have used the reference numeral 10 to indicate generally the frame of a motor vehicle, having the engine 11. The engine 11 has the hot exhaust manifold 12 leading to the exhaust discharge pipe 13.

We have shown the dash 14 and the inclined footboard 15 of the floor of the vehicle body.

The engine has the ordinary radiator 16 back of which is the usual fan 17.

Our improved heater comprises an enclosure 18 having generally the form of a downwardly opening channel, which is set down over the exhaust manifold in such manner as to receive the upper part thereof, as shown in Figure 1.

At its forward part, the outer wall 18ª of the enclosure 18 is extended downwardly lower than the rearward part of the said forward wall, and this downwardly projecting portion is preferably a trifle inset, as shown in Figure 2.

When the heater is used with some types of cars, it is probable that the inner wall of the enclosure member 18 may be dispensed with for a substantial portion or possibly all of its length.

The rear end of the enclosure member is intended to project through a suitable opening in the floor 15 and is provided with a movable closure member 19.

At the front of the device, there is provided a cap or the like 20 which closes the front end and projects downwardly to the lower edge of the portion 18ª. This cap or closure 20 is of considerable importance in our device for reasons that will be more fully explained.

The cap 20 is detachable in order to allow convenient access to the parts which are supported on it.

Supported on the cap 20 is a bearing 21. Connected with the bearing 21 is a supporting bracket 22, which is intended to be bolted to the engine 11, as illustrated for instance at 23 in Figure 2.

Journaled in the bearing 21 is a short shaft 24 on which are collars or the like 25 and 26, for limiting the longitudinal movement of the shaft 24 in its bearing.

An oil cup 24ª may be provided for lubricating the shaft 24.

Mounted on the forward end of the shaft 24 in front of the enclosure 18 is a suitable wind wheel 27 having blades of the ordinary type and adapted to be rotated by the draft caused from the fan 17. The inner end of the shaft 24 projects inwardly into the enclosure 18 a short distance from the bearing 21. On the inner end of the shaft 24 is a fan wheel 28.

It will, of course, be understood that the wind wheel 27 and fan wheel 28 are fixed to the shaft 24, so that the rotation of the wheel 27 imparts rotation to the shaft 24 and the fan 28.

The side walls of the enclosure 18 are inclined at the inner end of the enclosure as illustrated at 29 in Figure 1.

The closure member 19 is hinged as at 30 to the enclosure 18 and is provided with a handle 31, so that it can be lifted or lowered.

The pivot or hinge connections between the closure 19 and the enclosure 18 are preferably such as to afford a frictional connection, so that the closure member 19 will stand in any position to which it may be adjusted.

The enclosure 18 is provided with a short bottom member 32 extending from its rear or inner end approximately to the exhaust manifold 12 for the purpose of keeping cold air from entering the interior of the vehicle.

The projection 18$^a$ is provided with suitable holes to receive the bolts 33, which ordinarily hold the intake manifold clips or clamps in place, so that these bolts will help to support the enclosure 18. One of these holes is indicated at 35 in Figure 2.

Further purposes of our invention and some of its advantages will be obvious from the following description of the manner in which it functions.

When the device has been installed on the car and the car is operated, it is, of course, understood that the rotation of the fan 17 draws air through the radiator 16 for cooling the water in the radiator.

This creates a strong, rearward draft, which serves to impart rapid rotation to the wind wheel 27.

There is thus imparted rotation to the fan 28, which forces air rearwardly in the enclosure 18.

Since the cap 20 closes the forward end of the enclosure member 18, it will be seen that air will not be drawn directly through the radiator and into the front end of the heater, but must be drawn from below the heater. This, we consider, is a much more desirable construction than one in which air is drawn into the front end of the heater enclosure.

Air drawn directly into the front of the heater enclosure will generally be the very coldest air that has just been drawn in through the radiator. Air, however, drawn from below into the enclosure member will to a very substantial extent be air that has been partially warmed by contact with the engine under the hood of the automobile.

Some difficulties are involved, however, in securing a forced draft through the heater while at the same time closing the front end of the heater enclosure against the direct influx of the coldest air drawn through the radiator.

The problem thus involved we solve by extending the shaft 24 through the closure member 20 and providing the wind wheel 27 in front of the heater and the fan 28 in the heater. The fan 28 creates a direct inward blast of air and draws the air upwardly from below.

The enclosure member 18 may be provided with one or more holes 36 for allowing for the escape of air when the member 19 is closed.

It will be noted that the closure member 20 is in the form of a flanged cap.

The enclosure 18 is angular in cross section, so that when the flanged cap closure member 20 is installed in position, it will not rotate on the enclosure 18.

The closure member 20 and the wind wheel and fan are detachable from the enclosure as a unit.

The bracket 22 is connected with the journal for the shaft 24 and with the closure member 20 in any suitable way, and when it is fastened to the engine 11, as at 23, it serves to hold the enclosure in position on account of the angular cross sectional structure of the enclosure member and the flanged cap construction of the closure member 20 and the rigid connection of the bracket with the closure member 20.

We have found that even if the fan ceases to operate, enough draft passes through the radiator to operate the wheel 27.

Changes may, of course, be made in the details of the structure of this device without departing from the real spirit and purpose of our invention, and it is our intention to cover by our claims any modified forms of structure or use of mechanical equivalents, which may be reasonably included within the scope of such claims.

We claim as our invention:

1. In a vehicle heater, an enclosure member adapted to be placed over and receive a heated portion of an engine and having a channel adapted to extend from said heated portion into the body of a vehicle, a closure member at the front end of said enclosure, a fan mounted inside said enclosure near the front end thereof, a wind wheel outside said enclosure adapted to be actuated by the draft created by the ordinary engine fan and means for operatively connecting the fan in the enclosure with the wind wheel.

2. In a vehicle heater, an enclosure member adapted to be placed over and receive a heated portion of an engine and having a channel adapted to extend from said heated portion into the body of a vehicle, a closure member at the front end of said enclosure, a shaft journaled in said closure member, a wind wheel on the front end of said shaft adapted to be actuated by the draft created by the ordinary engine fan, and a fan on the other end of said shaft within the enclosure.

3. In a vehicle heater, an enclosure member adapted to be placed over and receive a heated portion of an engine and having a channel adapted to extend from said heated portion into the body of a vehicle, a closure member at the front end of said enclosure, a shaft journaled in said closure member, a wind wheel on the front end of said shaft adapted to be actuated by the draft created by the ordinary engine fan, and a fan on the other end of said shaft within the enclosure, said closure member being readily removable, whereby it and the shaft and wheel and fan may be quickly detached from the enclosure as a distinct unit.

4. In a vehicle heater, an enclosure member adapted to be placed over and receive a heated portion of an engine and having a channel adapted to extend from said heated portion into the body of a vehicle, a closure member at the front end of said enclosure, a shaft journaled in said closure member, a wind wheel on the front end of said shaft adapted to be actuated by the draft created by the ordinary engine fan, and a fan on the other end of said shaft within the enclosure, said closure member being readily removable, whereby it and the shaft and wheel and fan may be quickly detached from the enclosure as a distinct unit, said enclosure member having a journal for said shaft and a bracket connected with said journal and said closure member and adapted to be secured to an engine frame.

5. In a vehicle heater, an enclosure member adapted to be placed over and receive a heated portion of an engine and having a channel adapted to extend from said heated portion into the body of a vehicle, a closure member at the front end of said enclosure, a shaft journaled in said closure member, a wind wheel on the front end of said shaft adapted to be actuated by the draft created by the ordinary engine fan, a fan on the other end of said shaft within the enclosure, and a movable closure member at the other end of said enclosure.

Des Moines, Iowa, November 23, 1925.

HAMPTON I. SURLS.
JOHN T. KENNEDY.